US007720817B2

(12) United States Patent
Stager et al.

(10) Patent No.: US 7,720,817 B2
(45) Date of Patent: May 18, 2010

(54) METHOD AND SYSTEM FOR BROWSING OBJECTS ON A PROTECTED VOLUME IN A CONTINUOUS DATA PROTECTION SYSTEM

(75) Inventors: Roger Keith Stager, Livermore, CA (US); Donald Alvin Trimmer, Livermore, CA (US); Pawan Saxena, Pleasanton, CA (US); Craig Anthony Johnston, Livermore, CA (US); Yafen Peggy Chang, Fremont, CA (US); Rico Blaser, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 242 days.

(21) Appl. No.: 11/051,792

(22) Filed: Feb. 4, 2005

(65) Prior Publication Data
US 2005/0182953 A1 Aug. 18, 2005

Related U.S. Application Data

(60) Provisional application No. 60/541,626, filed on Feb. 4, 2004, provisional application No. 60/542,011, filed on Feb. 5, 2004.

(51) Int. Cl.
*G06F 12/00* (2006.01)
*G06F 17/30* (2006.01)
(52) U.S. Cl. ............... 707/649; 707/640; 707/650; 707/651; 707/999.202; 707/999.204; 714/1; 714/15
(58) Field of Classification Search ............ 707/1, 707/100, 102, 104, 200, 202, 204; 714/1, 714/15
See application file for complete search history.

(56) References Cited

U.S. PATENT DOCUMENTS

| 4,635,145 A | 1/1987 | Horie et al. |
| 4,727,512 A | 2/1988 | Birkner et al. |
| 4,775,969 A | 10/1988 | Osterlund |
| 5,163,148 A | 11/1992 | Walls |
| 5,235,695 A | 8/1993 | Pence |

(Continued)

FOREIGN PATENT DOCUMENTS

CA  2 256 934 A1  6/2000

(Continued)

OTHER PUBLICATIONS

AberdeenGroup, "Continuous Data Protection: Business Continuity for the Era of Networked Storage", Aberdeen Group Inc., Jul. 2003.*

(Continued)

*Primary Examiner*—Jean B. Fleurantin
*Assistant Examiner*—Hares Jami
(74) *Attorney, Agent, or Firm*—Perkins Coie LLP (57) ABSTRACT

A method for browsing objects on a protected volume in a continuous data protection system begins by displaying a list of top-level objects to a user who selects a top-level object to browse. A snapshot is selected from the selected top-level object and is decoded. A list of objects in the selected snapshot is displayed and the user selects an object to browse. The selected object is decoded and operations are performed on the selected object. The user can browse the protected volume by snapshots in the top-level object or by a range of time of coverage of the top-level object.

12 Claims, 6 Drawing Sheets

U.S. PATENT DOCUMENTS

| | | |
|---|---|---|
| 5,269,022 A | 12/1993 | Shinjo et al. |
| 5,297,124 A | 3/1994 | Plotkin et al. |
| 5,438,674 A | 8/1995 | Keele et al. |
| 5,455,926 A | 10/1995 | Keele et al. |
| 5,485,321 A | 1/1996 | Leonhardt et al. |
| 5,555,371 A | 9/1996 | Duyanovich et al. |
| 5,638,509 A | 6/1997 | Dunphy et al. |
| 5,666,538 A | 9/1997 | DeNicola |
| 5,673,382 A | 9/1997 | Cannon et al. |
| 5,774,292 A | 6/1998 | Georgiou et al. |
| 5,774,643 A | 6/1998 | Lubbers et al. |
| 5,774,715 A | 6/1998 | Madany et al. |
| 5,805,864 A | 9/1998 | Carlson et al. |
| 5,809,511 A | 9/1998 | Peake |
| 5,809,543 A | 9/1998 | Byers et al. |
| 5,835,953 A | 11/1998 | Ohran |
| 5,854,720 A | 12/1998 | Shrinkle et al. |
| 5,857,208 A | 1/1999 | Ofek |
| 5,864,346 A | 1/1999 | Yokoi et al. |
| 5,872,669 A | 2/1999 | Morehouse et al. |
| 5,875,479 A | 2/1999 | Blount et al. |
| 5,911,779 A | 6/1999 | Stallmo et al. |
| 5,949,970 A | 9/1999 | Sipple et al. |
| 5,961,613 A | 10/1999 | DeNicola |
| 5,963,971 A | 10/1999 | Fosler et al. |
| 5,974,424 A | 10/1999 | Schmuck et al. |
| 6,021,408 A | 2/2000 | Ledain et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,061,309 A | 5/2000 | Gallo et al. |
| 6,067,587 A | 5/2000 | Miller et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,131,148 A | 10/2000 | West et al. |
| 6,134,660 A | 10/2000 | Boneh et al. |
| 6,163,856 A | 12/2000 | Dion et al. |
| 6,173,293 B1 * | 1/2001 | Thekkath et al. ............ 707/201 |
| 6,173,359 B1 | 1/2001 | Carlson et al. |
| 6,195,730 B1 | 2/2001 | West |
| 6,225,709 B1 | 5/2001 | Nakajima |
| 6,247,096 B1 | 6/2001 | Fisher et al. |
| 6,260,110 B1 | 7/2001 | LeCrone et al. |
| 6,266,784 B1 | 7/2001 | Hsiao et al. |
| 6,269,423 B1 | 7/2001 | Kishi |
| 6,269,431 B1 | 7/2001 | Dunham |
| 6,282,609 B1 | 8/2001 | Carlson |
| 6,289,425 B1 | 9/2001 | Blendermann et al. |
| 6,292,889 B1 | 9/2001 | Fitzgerald et al. |
| 6,301,677 B1 | 10/2001 | Squibb |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,336,173 B1 | 1/2002 | Day et al. |
| 6,339,778 B1 | 1/2002 | Kishi |
| 6,341,329 B1 | 1/2002 | LeCrone et al. |
| 6,343,342 B1 | 1/2002 | Carlson |
| 6,353,837 B1 | 3/2002 | Blumenau |
| 6,360,232 B1 | 3/2002 | Brewer et al. |
| 6,389,503 B1 | 5/2002 | Georgis et al. |
| 6,397,307 B2 | 5/2002 | Ohran |
| 6,408,359 B1 | 6/2002 | Ito et al. |
| 6,487,561 B1 | 11/2002 | Ofek et al. |
| 6,496,791 B1 | 12/2002 | Yates et al. |
| 6,499,026 B1 | 12/2002 | Rivette et al. |
| 6,557,073 B1 | 4/2003 | Fujiwara |
| 6,557,089 B1 | 4/2003 | Reed et al. |
| 6,578,120 B1 | 6/2003 | Crockett et al. |
| 6,615,365 B1 | 9/2003 | Jenevein et al. |
| 6,625,704 B2 | 9/2003 | Winokur |
| 6,654,912 B1 | 11/2003 | Viswanathan et al. |
| 6,658,435 B1 | 12/2003 | McCall |
| 6,694,447 B1 | 2/2004 | Leach et al. |
| 6,725,331 B1 | 4/2004 | Kedem |
| 6,766,520 B1 | 7/2004 | Rieschl et al. |
| 6,779,057 B2 | 8/2004 | Masters et al. |
| 6,779,058 B2 | 8/2004 | Kishi et al. |
| 6,779,081 B2 | 8/2004 | Arakawa et al. |
| 6,816,941 B1 | 11/2004 | Carlson et al. |
| 6,816,942 B2 | 11/2004 | Okada et al. |
| 6,834,324 B1 | 12/2004 | Wood |
| 6,850,964 B1 | 2/2005 | Brough et al. |
| 6,877,016 B1 * | 4/2005 | Hart et al. ................... 707/201 |
| 6,898,600 B2 | 5/2005 | Fruchtman et al. |
| 6,915,397 B2 | 7/2005 | Lubbers et al. |
| 6,931,557 B2 | 8/2005 | Togawa |
| 6,950,263 B2 | 9/2005 | Suzuki et al. |
| 6,973,369 B2 | 12/2005 | Trimmer et al. |
| 6,973,534 B2 | 12/2005 | Dawson |
| 6,978,283 B1 | 12/2005 | Edwards et al. |
| 6,978,325 B2 | 12/2005 | Gibble |
| 7,007,043 B2 * | 2/2006 | Farmer et al. ............... 707/203 |
| 7,032,126 B2 | 4/2006 | Zalewski et al. |
| 7,055,009 B2 | 5/2006 | Factor et al. |
| 7,072,910 B2 | 7/2006 | Kahn et al. |
| 7,096,331 B1 | 8/2006 | Haase et al. |
| 7,100,089 B1 | 8/2006 | Phelps |
| 7,111,136 B2 | 9/2006 | Yamagami |
| 7,111,194 B1 | 9/2006 | Schoenthal et al. |
| 7,127,388 B2 | 10/2006 | Yates et al. |
| 7,127,577 B2 | 10/2006 | Koning et al. |
| 7,152,077 B2 | 12/2006 | Veitch et al. |
| 7,152,078 B2 | 12/2006 | Yamagami |
| 7,155,465 B2 | 12/2006 | Lee et al. |
| 7,155,586 B1 | 12/2006 | Wagner et al. |
| 7,200,546 B1 | 4/2007 | Nourmohamadian et al. |
| 7,200,726 B1 | 4/2007 | Gole et al. |
| 7,203,726 B2 | 4/2007 | Hasegawa |
| 7,346,623 B2 * | 3/2008 | Prahlad et al. .............. 707/102 |
| 2001/0047447 A1 | 11/2001 | Katsuda |
| 2002/0004835 A1 | 1/2002 | Yarbrough |
| 2002/0016827 A1 | 2/2002 | McCabe et al. |
| 2002/0026595 A1 | 2/2002 | Saitou et al. |
| 2002/0091670 A1 | 7/2002 | Hitz et al. |
| 2002/0095557 A1 | 7/2002 | Constable et al. |
| 2002/0144057 A1 | 10/2002 | Li et al. |
| 2002/0163760 A1 | 11/2002 | Lindsey et al. |
| 2002/0166079 A1 | 11/2002 | Ulrich et al. |
| 2002/0199129 A1 | 12/2002 | Bohrer et al. |
| 2003/0004980 A1 | 1/2003 | Kishi et al. |
| 2003/0005313 A1 | 1/2003 | Gammel et al. |
| 2003/0037211 A1 | 2/2003 | Winokur |
| 2003/0046260 A1 * | 3/2003 | Satyanarayanan et al. ...... 707/1 |
| 2003/0120476 A1 | 6/2003 | Yates et al. |
| 2003/0120676 A1 | 6/2003 | Holavanahalli et al. |
| 2003/0126136 A1 | 7/2003 | Omoigui |
| 2003/0126388 A1 | 7/2003 | Yamagami |
| 2003/0135672 A1 | 7/2003 | Yip et al. |
| 2003/0149700 A1 | 8/2003 | Bolt |
| 2003/0158766 A1 | 8/2003 | Mital et al. |
| 2003/0182301 A1 | 9/2003 | Patterson et al. |
| 2003/0182350 A1 | 9/2003 | Dewey |
| 2003/0188208 A1 | 10/2003 | Fung |
| 2003/0217077 A1 | 11/2003 | Schwartz et al. |
| 2003/0225800 A1 | 12/2003 | Kavuri |
| 2004/0015731 A1 | 1/2004 | Chu et al. |
| 2004/0098244 A1 | 5/2004 | Dailey et al. |
| 2004/0103147 A1 | 5/2004 | Flesher et al. |

| | | | |
|---|---|---|---|
| 2004/0167903 A1 | 8/2004 | Margolus et al. | |
| 2004/0168057 A1 | 8/2004 | Margolus et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1* | 2/2005 | Liang et al. | 709/212 |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0097260 A1 | 5/2005 | McGovern et al. | |
| 2005/0108302 A1 | 5/2005 | Rand et al. | |
| 2005/0144407 A1 | 6/2005 | Colgrove et al. | |
| 2005/0182910 A1 | 8/2005 | Stager et al. | |
| 2005/0240813 A1 | 10/2005 | Okada et al. | |
| 2006/0010177 A1 | 1/2006 | Kodama | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Perry | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |
| 2006/0259160 A1 | 11/2006 | Hood et al. | |

FOREIGN PATENT DOCUMENTS

| | | |
|---|---|---|
| EP | 0 845 733 A2 | 6/1998 |
| EP | 0 869 460 A2 | 10/1998 |
| EP | 1 058 254 A2 | 12/2000 |
| EP | 1 122 910 A1 | 8/2001 |
| EP | 1 233 414 A2 | 8/2002 |
| EP | 1333379 | 4/2006 |
| EP | 1 671 231 | 6/2006 |
| EP | 1 671231 | 6/2006 |
| WO | WO99/03098 | 1/1999 |
| WO | WO99/06912 | 2/1999 |
| WO | WO-0118633 A1 | 3/2001 |
| WO | WO-03067438 A2 | 8/2003 |
| WO | WO-2004084010 A2 | 9/2004 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

Microsoft, "Microsoft Widows XP", Microsoft Incorporation, 2001.*
Joan Daemen et al., "AES Proposal: Rijndael", The Rijndael.Block Cipher, Document Version 2, Mar. 1999, 45 pages.
Joan Daemen et al., "Note on Naming", Rijndael, Sep. 4, 2003, 2 pages.
Decru, "Decru Dalafort E-Series Storage Security Appliances, Transparant Data Security for Network Attached Storage (NAS)", 2004, 2 pages.
Simon L. Garfinkel et al., "Rememberance of Data Passed: A Study of Disk Sanitization Practices", IEEE Security and privacy, vol. 1, No. 1, 2003 19 pages.
Hatfield, "White Read Verify Feature Set". May 14, 2004.
Chris Lueth, "WORM Storage on Magnetic Disks using SnapLock Compliance™ and SnapLock Enterprise™", Network Applicance, Inc., Sep. 2003, sections 1-5 13 pages.

"Network Appliance WORM Storage solution: SEC 17a-4(f) Compliance Assessment", Network Applicance, Inc., Jul. 10, 2003, pp. 1-20.
Novell NetWare Server Disks And Storage Devices Administration Guide. Netware 5.1, Jan. 2000, pp. 1-60.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storgage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance SOlution to Market: Three Companies Join to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacrityus Software, Jan. 13, 2004.
Baltazar, Henry "Weaving Apps Into SAN Fabric" eWEEK, Mar. 24, 2003.
Baltazar, Henry " More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Bighgar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape" Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Apliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

"Alacritus Software's Securitus I: Pointing the way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the way to Virtual Tape Libraries" Aberdeen Group, Inc., Jul. 2003.

"Alacritus Software's Securitus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Gaurd—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Camphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.

"Securitus White Paper: Disk Based Data Protection from Alacritus Software" Alacritus Website, Oct. 2003.

"Manageability: Securitus v. Tape" Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

"No Changes Required: Securitus v. Tape " Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnersip in Backup Arena" InfoStor, Nov. 2001.

Preston, W. Curtis "Surprise! Cheap Disks Cure Slow Backup" Storage Magazine, Jun. 1, 2002.

"Alacritus, Hitachi CP and Nissho team to Create Virtual.Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape " Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

"Alacritus Software's Securitus I: Pointing the Way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Alacritus Software's Securitus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus 1 Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Comphuisen, Alicia, "Hitachi Inks OEM Deal with Legato" Knapp Comm., Jul. 17, 2002.

"Alacritus Announces Disk-Based Successor to Tape" Knapp Comm., Aug. 21, 2002.

Biggar, Heidi, "Alacritus Enables Disk-Based Backup" InfoStor, Sep. 2001.

"Securitus I White Paper: Disk Based Data Protection from Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual tape Library Technology Brochure" Alacritus Software, Inc., Jul. 2001.

"Disk-Based Data Protection" Alacritus Software, Inc., Sep. 2001.

"Disk-Based Data Protection" Alacritus Software, Inc., Sep. 2002.

Payack, Paul JJ, "Alacritus Lines Up OEM Partners for Virtual Tape Library Push" The (451) Storage & Systems, Oct. 4, 2002.

Payack, Paul JJ, "Alacritus Software Announces Continuous Data Protection with New Chronospan Technology" Oct. 28, 2003.

Payack, Paul JJ, "Alacritus Software Announces New Customers for Securitus VTLA" Alacritus Software, Jan. 13, 2004.

Baltazar, Henry "Weaving Apps Into SAN Fabric" eWEEK, Mar. 24, 2003.

Baltazar, Henry "More Intelligence is on the Way" eWEEK, Sep. 15, 2003.

Barrett, Alex "The Case for Network Smarts" Storage Magazine, Jun. 2003.

"Securitus White Paper: Disk Based Data Protection from Alacritus Software" Alacritus Website, Oct. 2003.

"Manageability: Securitus v. Tape" Alacritus Website, Oct. 2003.

"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.

"No Changes Required: Securitus v. Tape" Alacritus Website, Oct. 2003.

"Customer Success" Alacritus Website, Oct. 2003.

"Chronospan" Alacritus Website, Oct. 2003.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Tape Library" internetnews.com, Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup Performance and Scalability" Alacritus Software, Jul. 8, 2002.

Komiega, Kevin, "Vendor Pushes Disk Backup Over Tape" SearchStorage.com Jan. 10, 2003.

"Testimonials" Alacritus Website, Oct. 2003.

"Seamless Integration" Alacritus Website, Oct. 2003.

"Topologies" Alacritus Website, Oct. 7, 2003.

"Securitus" Alacritus Website, Oct. 2003.

"Scalability: Securitus v. Tape" Alacritus Website, Oct. 2003.

"Strengths: Securitus v. Tape" Alacritus Website, Oct. 2003.

"Alacritus Creates 'Next Critical Step' in Disaster Recovery for Patrick Air Force Base, Securitus VTL Sets the Pace", Apr. 20, 2004.

"Alacritus to Demonstrate Chronospan CDP with the Brocade Fabric Application Platform at Storage Networking World", Apr. 1, 2004.

"Alacritus to Demo Chronospan Continuous Data Protection with the Cisco MDS 9000", Apr. 1, 2004.

"Alacritus and Network Appliance Deliver Advanced Virtual Tape Library, Solution Shortens Backup Windows, Accelerates Data Recovery, and Simplifies Backup Management", Dec. 7, 2004.

"Cisco and Storage ISVs to Demo Protocol-Based Interface between Storage Appliances and the Cisco MDS 9000", Mar. 30, 2004.

"Case Study Shizuoka-ken Noukyou Densan Center K.K., Reducing Management Costs Through Tapeless Backup At An iDC", Apr. 7, 2004.

"Alacritus Software's Securitus I: Pointing the Way to Virtual Tape Libraries" Aberdeen Group, Inc., Mar. 2002.

"Continuous Data Protection: Business Continuity for the Era of Networked Storage: An Executive White Paper" Aberdeen Group, Inc., Jul. 2003.

"Alacritus Software's Chronospan: Make Time for Continuous Data Protection" Aberdeen Group, Inc., Oct. 2003.

Hill, David "Alacritus Software's Securitus: Defining the Way to Virtual Tape Libraries" Aberdeen Group, Inc., Jul. 2003.

"Alacritus: Defining the Way to Virtual Tape Libraries" Aberdeen Group, Inc., Jul. 2003.

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alacritus Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library Support for Legato NetWorker Data Protection Solution" Alacritus Software, Inc., Jan. 8, 2002.

Camphuisen, Alicia, "Hitachi Inks IEM Deal with Legato" Knapp Comm., Jul. 17, 2002.

"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securities VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enahced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management", Dec. 7, 2004.
"Cisco and Storage ISVs to Demo Protocol-Based Interface between Storage Appliances and the Cisco MDS 9000", Mar. 30, 2004.
"Case Study Shizuoka-ken Noukyou Densan Center K.K., Reducing Management Costs Through Tapeless Backup At An iDC", Apr. 7, 2004.
"Alacritus Software's Securitus I: Pointing the Way to Virtual Tape Libraries" Aberdeen Group, Inc., Mar. 2002.
"Continuous Data Protection: Business Continuity for the Era of Networked Storage: An Executive White Paper" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Join to Delivery VTLA Smart Gaurd—A Disk Subsystem Product that FUnctions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for legato Networker Data Protection Solution" Alacritus Software, Inc., Jan. 8, 2002.
Camphuisen, Alicia, "Hitachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritius Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.
"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Networks Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" internetnews.com, Jun. 25, 2001.
"Alacritus Software and Rhapsody Networks to Develop breakthrough Backup Solutions for Storage networks: Companies to Provide First Network-Intelligent Virtual Tape Solution Resulting in Dramatic ROI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.

"Securitus" Alacritus Website, Oct. 2003.
"Scalability: Securitus v. Tape" Alacritus Website, Oct. 2003.
"Strengths: Securitus v. Tape " Alacritus Website, Oct. 2003.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management" , Dec. 7, 2004.
"Cisco and Storage ISVs to Demo Protocol-Based Interface between Storage Appliances and the Cisco MDS 9000", Mar. 30, 2004.
"Case Study Shizuoka-ken Noukyou Densan Center K.K., Reducing Management Costs Through Tapeless Backup At An iDC", Apr. 7, 2004.
"Alacritus Software's Securitus I: Pointing the way to Virtual Tape Libraries" Aberdeen Group, Inc., Mar. 2002.
"Continuous Data Protection: Business Continuity for the Era of Networked Storage: An Executive White Paperf" Aberdeen Group, Inc., Jul. 2003.
"Alacritus Software's Chronospan: Make Time for Continuous Data Protection" Aberdeen Group, Inc., Oct. 2003.
Hill, David "Alacritus Software's Securitus: Defining the Way to Virtual Tape Libraries" Aberdeen Group, Inc., Jul. 2003.
"Alacritus Software's Securitus: Defining the Way to Virtual Tape Libraries" Aberdeen Group, Inc., Jul. 2003.
"Product Brief: Rhapsody/Alacritus-Secritus/XPath Virtual Tape in the Fabric" The Enterprise Storage Group, Aug. 2002.
"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.
"Alacritus, Hitachi CP and Nissho Team to Create Virtual Tape Library Appliance: Industry's First Virtual Tape Library Appliance to Replace Storage Tape Libraries" Alacritus Software, Inc., Jun. 25, 2001.
"Hitachi CP, Nissho, and Alacritus Software Bring Virtual Tape Library Appliance Solution to Market: Three Companies Joint to Deliver VTLA Smart Guard—A Disk Subsystem Product that Functions as a Virtual Storage Tape Library" Alacritus Software, Inc., Oct. 3, 2001.
Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.
"Alacritus Software Announces Virtual Tape Library Support for Legato NetWorker Data Protection Solution" Alacritus Software, Inc., Jan. 8, 2002.
Camphuisen, Alicia, "Hitqachi Inks OEM Deal with Legato" Knapp Comm., Jul. 17, 2002.
"Alacritus Announces Disk-Based Successor to Tape" Knapp Comm., Aug. 21, 2002.
Biggar, Heidi, "Alacritus Enables Disk-Based Backup" InfoStor, Sep. 2001.
"Securitus I White Paper: Disk Based Data Protection from Alacritus Software" Alacritus Software, Inc., Jul. 2001.
"Alacritus Software FAQs" Alacritus Software, Inc., Jul. 2001.
"Disk-Based Data Protection" Alacritus Software, Inc., Jul. 2001.
"Virtual Tape Library Technology Brochure" Alacritus Software, Inc., Jul. 2001.
"Disk-Based Data Protection" Alacritus Software, Inc., Sep. 2001.

"Disk-Based Data Protection" Alacritus Software, Inc., Sep. 2002.
Payack, Paul JJ, "Alacritus Lines Up OEM Partners for Virtual Tape Library Push" The (451) Storage & Systems, Oct. 4, 2002.
Payack, Paul JJ, "Alacritus Software Announces Continuous Data Protection with New Chronospan Technology" Oct. 28, 2003.
Payack, Paul JJ, "Alacritus Software Announces New Customers for Securitus VTLA" Alacritus Software, Jan. 13, 2004.
Baltazar, Henry "Weaving Apps Into SAN Fabric" eWEEK, Mar. 24, 2003.
Baltazar, Henry "More Intelligence is on the Way" eWEEK, Sep. 15, 2003.
Barrett, Alex "The Case for Network Smarts" Storage Magazine, Jun. 2003.
"Securitus White Paper: Disk Based Data Protection from Alacritus Software" Alacritus Website, Oct. 2003.
"Manageability: Securitus v. Tape" Alacritus Website, Oct. 2003.
"The SNIA Data Management Forum Created to Tackle Data Protection and Information Lifecycle Management Issues: Enhanced Backup Solutions Initiative Rolls Efforts into New SNIA Forum" Storage Networking Industry Association, Oct. 13, 2003.
"No Changes Required: Securitus v. Tape" Alacritus Website, Oct. 2003.
"Customer Success" Alacritus Website, Oct. 2003.
"Chronospan" Alacritus Website, Oct. 2003.
"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.
Biggar, Heidi, "Disk and Tape Forge New Partnership in Backup Arena" InfoStor, Nov. 2001.
Preston, W. Curtis, "Surprise! Cheap Disks Cure Slow Backup" Storage Magazine, Jun. 1, 2002.
"Alacritus, Hitachi CP and Nissho Team to Create Virtual Tape Library" Internetnews.com, Jun. 25, 2001.
"Alacritus Software and Rhapsody Networks to Develop Breakthrough Backup Solutions for Storage Networks: Companies to Provide First Network-Intelligent Virtual Tape Solution Resulting in Dramatic FOI, Increases in Data Backup Performance and Scalability" Alacritus Software, Jul. 8, 2002.
Komiega, Kevin, "Vendor Pushes Disk Backup Over Tape" SearchStorage.com Jan. 10, 2003.
"Testimonials" Alacritus Website, Oct. 2003.
"Seamless Integration" Alacritus Website, Oct. 2003.
"Topologies" Alacritus Website, Oct. 7, 2003.
"Securitus" Alacritus Website, Oct. 2003.
"Scalability: Securitus v. Tape" Alacritus Website, Oct. 2003.
"Strengths: Securitus v. Tape" Alacritus Website, Oct. 2003.
"Alacritus Creates 'Next Critical Step' in Disaster Recovery for Patrick Air Force Base, Securitus VTL Sets the Pace", Apr. 20, 2004.
"Alacritus to Demonstrate Chronospan CDP with the Brocade Fabric Application Platform at Storage Networking World", Apr. 1, 2004.
"Alacritus to Demo Chronospan Continuous Data Protection with the Cisco MDS 9000", Apr. 1, 2004.
"Alacritus and Network Appliance Deliver Advanced Virtual Tape Library, Solution Shortens Backup Windows, Accelerates Data Recovery, and Simplifies Backup Management", Dec. 7, 2004.
"Cisco and Storage ISVs to Demo Protocol-Based Interface between Storage Appliances and the Cisco MDS 9000", Mar. 30, 2004.
"Case Study Shizuoka-ken Noukyou Densan Center K.K., Reducing Management Costs Through Tapeless Backup At An iDC", Apr. 7, 2004.

* cited by examiner

METHOD AND SYSTEM FOR BROWSING OBJECTS ON A PROTECTED VOLUME IN A CONTINUOUS DATA PROTECTION SYSTEM

CROSS REFERENCE TO RELATED APPLICATIONS

This application claims priority from U.S. Provisional Application No. 60/541,626, filed on Feb. 4, 2004 and U.S. Provisional Application No. 60/542,011, filed on Feb. 5, 2004, which are incorporated by reference as if fully set forth herein.

FIELD OF INVENTION

The present invention relates generally to continuous data protection, and more particularly, to browsing files on a protected volume in a continuous data protection system.

BACKGROUND

Hardware redundancy schemes have traditionally been used in enterprise environments to protect against component failures. Redundant arrays of independent disks (RAID) have been implemented successfully to assure continued access to data even in the event of one or more media failures (depending on the RAID Level). Unfortunately, hardware redundancy schemes are ineffective in dealing with logical data loss or corruption. For example, an accidental file deletion or virus infection is automatically replicated to all of the redundant hardware components and can neither be prevented nor recovered from by such technologies. To overcome this problem, backup technologies have traditionally been deployed to retain multiple versions of a production system over time. This allowed administrators to restore previous versions of data and to recover from data corruption.

Backup copies are generally policy-based, are tied to a periodic schedule, and reflect the state of a primary volume (i.e., a protected volume) at the particular point in time that is captured. Because backups are not made on a continuous basis, there will be some data loss during the restoration, resulting from a gap between the time when the backup was performed and the restore point that is required. This gap can be significant in typical environments where backups are only performed once per day. In a mission-critical setting, such a data loss can be catastrophic. Beyond the potential data loss, restoring a primary volume from a backup system can be complicated and often takes many hours to complete. This additional downtime further exacerbates the problems associated with a logical data loss.

The traditional process of backing up data to tape media is time driven and time dependent. That is, a backup process typically is run at regular intervals and covers a certain period of time. For example, a full system backup may be run once a week on a weekend, and incremental backups may be run every weekday during an overnight backup window that starts after the close of business and ends before the next business day. These individual backups are then saved for a predetermined period of time, according to a retention policy. In order to conserve tape media and storage space, older backups are gradually faded out and replaced by newer backups. Further to the above example, after a full weekly backup is completed, the daily incremental backups for the preceding week may be discarded, and each weekly backup may be maintained for a few months, to be replaced by monthly backups. The daily backups are typically not all discarded on the same day. Instead, the Monday backup set is overwritten on Monday, the Tuesday backup set is overwritten on Tuesday, and so on. This ensures that a backup set is available that is within eight business hours of any corruption that may have occurred in the past week.

Despite frequent hardware failures and the necessity of ongoing maintenance and tuning, the backup creation process can be automated, while restoring data from a backup remains a manual and time-critical process. First, the appropriate backup tapes need to be located, including the latest full backup and any incremental backups made since the last full backup. In the event that only a partial restoration is required, locating the appropriate backup tape can take just as long. Once the backup tapes are located, they must be restored to the primary volume. Even under the best of circumstances, this type of backup and restore process cannot guarantee high availability of data.

Another type of data protection involves making point in time (PIT) copies of data. A first type of PIT copy is a hardware-based PIT copy, which is a mirror of the primary volume onto a secondary volume. The main drawbacks to a hardware-based PIT copy are that the data ages quickly and that each copy takes up as much disk space as the primary volume. A software-based PIT, typically called a "snapshot," is a "picture" of a volume at the block level or a file system at the operating system level. Various types of software-based PITs exist, and most are tied to a particular platform, operating system, or file system. These snapshots also have drawbacks, including occupying additional space on the primary volume, rapid aging, and possible dependencies on data stored on the primary volume wherein data corruption on the primary volume leads to corruption of the snapshot. In addition, snapshot systems generally do not offer the flexibility in scheduling and expiring snapshots that backup software provides.

While both hardware-based and software-based PIT techniques reduce the dependency on the backup window, they still require the traditional tape-based backup and restore process to move data from disk to tape media and to manage the different versions of data. This dependency on legacy backup applications and processes is a significant drawback of these technologies. Furthermore, like traditional tape-based backup and restore processes, PIT copies are made at discrete moments in time, thereby limiting any restores that are performed to the points in time at which PIT copies have been made.

In a typical data backup/recovery setting, a list of files saved is maintained, often in a database. The backup copy on disk is reviewed to decode the metadata, such as the file system structure, which is then presented to the user in a usable form. The file system would be mounted and then the snapshot would be loaded. In order for a user to find a particular version of a file, the user would have to look at multiple snapshots, which is unnecessarily time consuming.

A need therefore exists for a system that combines the advantages of tape-based based systems with the advantages of snapshot systems and eliminates the limitations described above.

SUMMARY

The present invention "dissects" a snapshot for the user, by displaying the files contained in a snapshot by performing look-ups into the file database dynamically. While this discussion is in terms of a file system, the principles of the present invention can be applied to any stored data that has metadata, such that if the metadata structure is known, the stored data can be readily decoded.

A method for browsing objects on a protected volume in a continuous data protection system begins by displaying a list of top-level objects to a user who selects a top-level object to browse. A snapshot is selected from the selected top-level object and is decoded. A list of objects in the selected snapshot is displayed and the user selects an object to browse. The selected object is decoded and operations are performed on the selected object. The user can browse the protected volume by snapshots in the top-level object or by a range of time of coverage of the top-level object.

A system for browsing objects on a protected volume in a continuous data protection system includes display means, selecting means, decoding means, and performing means. The display means displays a list of objects to a user to browse, who uses the selecting means to selecting an object. The decoding means decodes the object selected by the user and the performing means performs an action on the selected object.

A method for browsing objects by snapshot on a protected volume in a continuous data protection system begins by displaying a list of snapshots of at least a portion of the protected volume to a user. The user selects a snapshot, which is then decoded. A list of objects in the selected snapshot is displayed and the user selects an object to browse. The selected object is decoded and operations are performed on the selected object.

A method for browsing objects by time on a protected volume in a continuous data protection system begins by displaying a range of times of coverage of the protected volume. The user selects a point in time and a snapshot corresponding to the selected point in time is decoded. A list of objects in the decoded snapshot is displayed and the user selects an object to browse. The selected object is decoded and operations are performed on the selected object.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

In the present invention, data is backed up continuously, allowing system administrators to pause, rewind, and replay live enterprise data streams. This moves the traditional backup methodologies into a continuous background process in which policies automatically manage the lifecycle of many generations of restore images.

System Construction

Figure 1A:
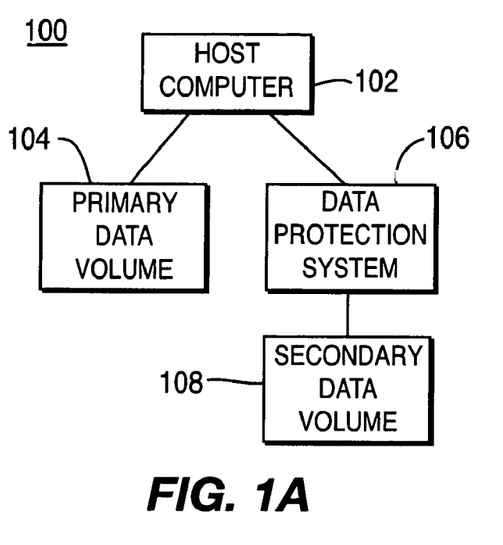
FIGS. 1A-1C are block diagrams showing a continuous data protection environment in accordance with the present invention.

FIG. 1A shows a preferred embodiment of a protected computer system 100 constructed in accordance with the present invention. A host computer 102 is connected directly to a primary data volume 104 (the primary data volume may also be referred to as the protected volume) and to a data protection system 106. The data protection system 106 manages a secondary data volume 108. The construction of the system 100 minimizes the lag time by writing directly to the primary data volume 104 and permits the data protection system 106 to focus exclusively on managing the secondary data volume 108. The management of the secondary volume 108 is preferably performed using a volume manager.

A volume manager is a software module that runs on a server or intelligent storage switch to manage storage resources. Typical volume managers have the ability to aggregate blocks from multiple different physical disks into one or more virtual volumes. Applications are not aware that they are actually writing to segments of many different disks because they are presented with one large, contiguous volume. In addition to block aggregation, volume managers usually also offer software RAID functionality. For example, they are able to split the segments of the different volumes into two groups, where one group is a mirror of the other group. This is, in a preferred embodiment, the feature that the data protection system is taking advantage of when the present invention is implemented as shown in FIG. 1A. In many environments, the volume manager or host-based driver already mirrors the writes to two distinct different primary volumes for redundancy in case of a hardware failure. The present invention is configured as a tertiary mirror target in this scenario, such that the volume manager or host-based driver also sends copies of all writes to the data protection system.

It is noted that the primary data volume 104 and the secondary data volume 108 can be any type of data storage, including, but not limited to, a single disk, a disk array (such as a RAID), or a storage area network (SAN). The main difference between the primary data volume 104 and the secondary data volume 108 lies in the structure of the data stored at each location, as will be explained in detail below. It is noted that there may also be differences in terms of the technologies that are used. The primary volume 104 is typically an expensive, fast, and highly available storage subsystem, whereas the secondary volume 108 is typically cost-effective, high capacity, and comparatively slow (for example, ATA/SATA disks). Normally, the slower secondary volume cannot be used as a synchronous mirror to the high-performance primary volume, because the slower response time will have an adverse impact on the overall system performance.

The data protection system 106, however, is optimized to keep up with high-performance primary volumes. These optimizations are described in more detail below, but at a high level, random writes to the primary volume 104 are processed sequentially on the secondary volume 108. Sequential writes improve both the cache behavior and the actual volume performance of the secondary volume 108. In addition, it is possible to aggregate multiple sequential writes on the secondary volume 108, whereas this is not possible with the random writes to the primary volume 104. The present invention does not require writes to the data protection system 106 to be synchronous. However, even in the case of an asynchronous mirror, minimizing latencies is important.

Figure 1B:
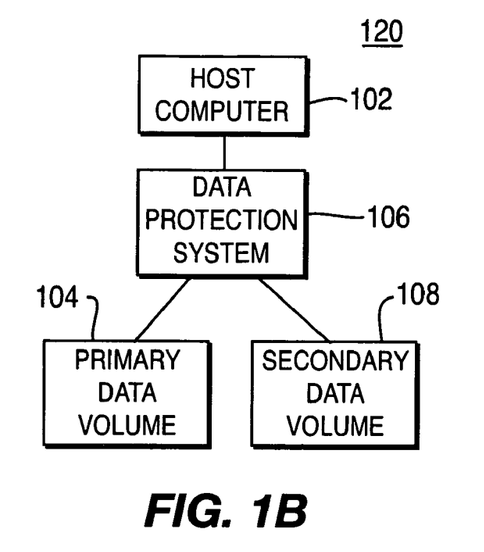

FIG. 1B shows an alternate embodiment of a protected computer system 120 constructed in accordance with the present invention. The host computer 102 is directly connected to the data protection system 106, which manages both the primary data volume 104 and the secondary data volume 108. The system 120 is likely slower than the system 100 described above, because the data protection system 106 must manage both the primary data volume 104 and the secondary data volume 108. This results in a higher latency for writes to the primary volume 104 in the system 120 and lowers the available bandwidth for use. Additionally, the introduction of a new component into the primary data path is undesirable because of reliability concerns.

Figure 1C:
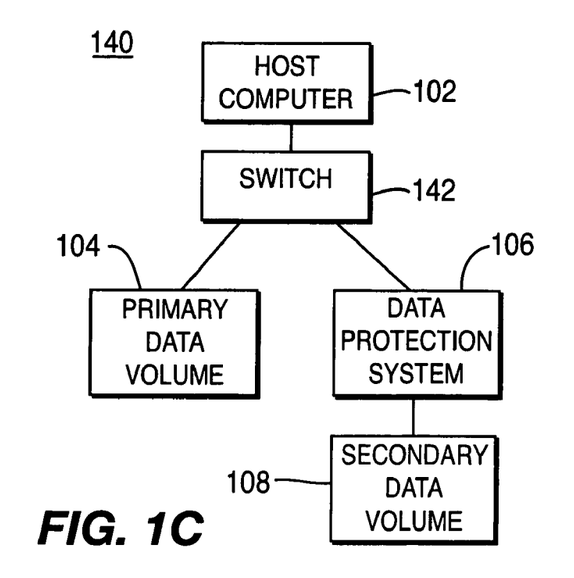

FIG. 1C shows another alternate embodiment of a protected computer system 140 constructed in accordance with the present invention. The host computer 102 is connected to an intelligent switch 142. The switch 142 is connected to the primary data volume 104 and the data protection system 106, which in turn manages the secondary data volume 108. The switch 142 includes the ability to host applications and contains some of the functionality of the data protection system 106 in hardware, to assist in reducing system latency and improve bandwidth.

It is noted that the data protection system 106 operates in the same manner, regardless of the particular construction of the protected computer system 100, 120, 140. The major difference between these deployment options is the manner and place in which a copy of each write is obtained. To those skilled in the art it is evident that other embodiments, such as the cooperation between a switch platform and an external server, are also feasible.

Conceptual Overview

To facilitate further discussion, it is necessary to explain some fundamental concepts associated with a continuous data protection system constructed in accordance with the present invention. In practice, certain applications require continuous data protection with a block-by-block granularity, for example, to rewind individual transactions. However, the period in which such fine granularity is required is generally short (for example, two days), which is why the system can be configured to fade out data over time. The present invention discloses data structures and methods to manage this process automatically.

The present invention keeps a log of every write made to a primary volume (a "write log") by duplicating each write and directing the copy to a cost-effective secondary volume in a sequential fashion. The resulting write log on the secondary volume can then be played back one write at a time to recover the state of the primary volume at any previous point in time. Replaying the write log one write at a time is very time consuming, particularly if a large amount of write activity has occurred since the creation of the write log. In typical recovery scenarios, it is necessary to examine how the primary volume looked like at multiple points in time before deciding which point to recover to. For example, consider a system that was infected by a virus. In order to recover from the virus, it is necessary to examine the primary volume as it was at different points in time to find the latest recovery point where the system was not yet infected by the virus. Additional data structures are needed to efficiently compare multiple potential recovery points.

A snapshot in the present invention is a marker in the write log and a delta map (explained below); i.e., simply a point in time to which the system can recover to at a later time. Delta maps are kept for that point in time until the snapshot expires. In addition, all data blocks on the secondary volume that the delta map refers to are retained until the snapshot (and the delta map) expires. Because all data has already been stored in the write log, no data movement is necessary to take a snapshot.

Delta Maps

Delta maps provide a mechanism to efficiently recover the primary volume as it was at a particular point in time without the need to replay the write log in its entirety, one write at a time. In particular, delta maps are data structures that keep track of data changes between two points in time. These data structures can then be used to selectively play back portions of the write log such that the resulting point-in-time image is the same as if the log were played back one write at a time, starting at the beginning of the log.

Figure 2:
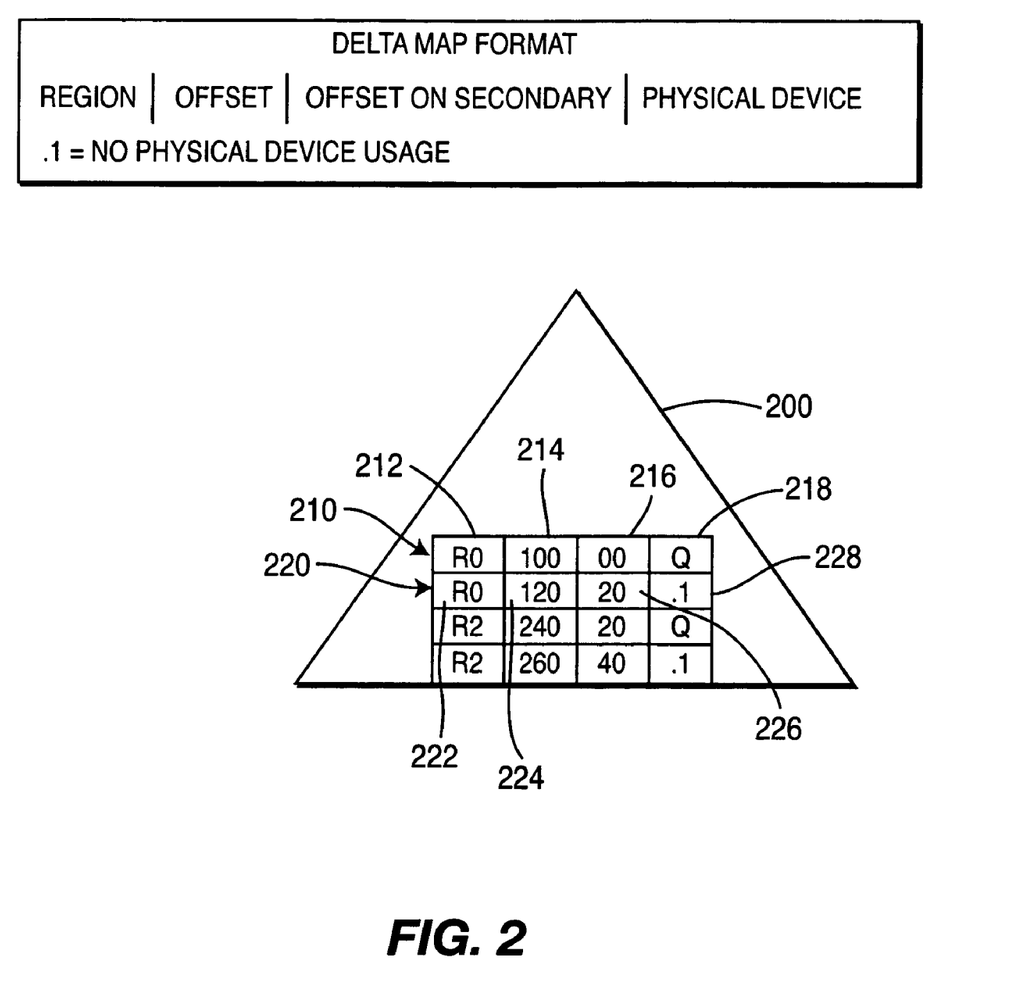
FIG. 2 is an example of a delta map in accordance with the present invention.

FIG. 2 shows a delta map 200 constructed in accordance with the present invention. While the format shown in FIG. 2 is preferred, any format containing similar information may be used. For each write to a primary volume, a duplicate write is made, in sequential order, to a secondary volume. To create a mapping between the two volumes, it is preferable to have an originating entry and a terminating entry for each write. The originating entry includes information regarding the origination of a write, while the terminating entry includes information regarding the termination of a write.

As shown in delta map 200, row 210 is an originating entry and row 220 is a terminating entry. Row 210 includes a field 212 for specifying the region of a primary volume where the first block was written, a field 214 for specifying the block offset in the region of the primary volume where the write begins, a field 216 for specifying where on the secondary volume the duplicate write (i.e., the copy of the primary volume write) begins, and a field 218 for specifying the physical device (the physical volume or disk identification) used to initiate the write. Row 220 includes a field 222 for specifying the region of the primary volume where the last block was written, a field 224 for specifying the block offset in the region of the primary volume where the write ends, a field 226 for specifying the where on the secondary volume the duplicate write ends, and a field 228. While fields 226 and 228 are provided in a terminating entry such as row 220, it is noted that field 226 is optional because this value can be calculated by subtracting the offsets of the originating entry and the terminating entry (field 226=(field 224−field 214)+field 216), and field 228 is not necessary since there is no physical device usage associated with termination of a write.

In a preferred embodiment, as explained above, each delta map contains a list of all blocks that were changed during the particular time period to which the delta map corresponds. That is, each delta map specifies a block region on the primary volume, the offset on the primary volume, and physical device information. It is noted, however, that other fields or a completely different mapping format may be used while still achieving the same functionality. For example, instead of dividing the primary volume into block regions, a bitmap could be kept, representing every block on the primary volume. Once the retention policy (which is set purely according to operator preference) no longer requires the restore granularity to include a certain time period, corresponding blocks are freed up, with the exception of any blocks that may still be necessary to restore to later recovery points. Once a particular delta map expires, its block list is returned to the appropriate block allocator for re-use.

Delta maps are initially created from the write log using a map engine, and can be created in real-time, after a certain number of writes, or according to a time interval. It is noted that these are examples of ways to trigger the creation of a delta map, and that one skilled in the art could devise various other triggers. Additional delta maps may also be created as a result of a merge process (called "merged delta maps") and may be created to optimize the access and restore process. The delta maps are stored on the secondary volume and contain a mapping of the primary address space to the secondary address space. The mapping is kept in sorted order based on the primary address space.

One significant benefit of merging delta maps is a reduction in the number of delta map entries that are required. For example, when there are two writes that are adjacent to each other on the primary volume, the terminating entry for the first write can be eliminated from the merged delta map, since its location is the same as the originating entry for the second write. The delta maps and the structures created by merging maps reduces the amount of overhead required in maintaining the mapping between the primary and secondary volumes.

Data Recovery

Data is stored in a block format, and delta maps can be merged to reconstruct the full primary volume as it looked like at a particular point in time. Users need to be able to access this new volume seamlessly from their current servers. There are two ways to accomplish this at a block level. The first way is to mount the new volume (representing the primary volume at a previous point in time) to the server. The problem with this approach is that it can be a relatively complex configuration task, especially since the operation needs to be performed under time pressure and during a crisis situation, i.e., during a system outage. However, some systems now support dynamic addition and removal of volumes, so this may not be a concern in some situations.

The second way to access the recovered primary volume is to treat the recovered volume as a piece of removable media (e.g., a CD), that is inserted into a shared removable media drive. In order to properly recover data from the primary volume at a previous point in time, an image of the primary volume is loaded onto a location on the network, each location having a separate identification known as a logical unit number (LUN). This image of the primary volume can be built by using a method to recover data by accessing a previously stored snapshot, as disclosed in copending U.S. application Ser. No. 10/772,017, filed Feb. 4, 2004, which is incorporated by reference as if fully set forth herein.

After the snapshot has been loaded onto the restore LUN, the user can access the snapshot as if it were the primary volume at the selected previous point in time. The snapshot is fully read/write accessible, and the user can perform a rollforward of all the writes that occurred from the time of the snapshot. Changes made to the snapshot are not duplicated onto the primary volume, because the snapshot is, by definition, a reflection of the primary volume at a previous point in time. It is noted that while the user is accessing a snapshot, the primary volume is still being protected as under normal operating conditions. Furthermore, different snapshots can be loaded into different LUNs; the user is not restricted to accessing one snapshot at a time. Once the user is finished with the restore LUN(s), the GUI can be used to unload the snapshot or the snapshot can be ejected from the shared removable media drive by the host, similar to how a CD can be ejected.

PIT Maps

Whenever a snapshot is triggered, a PIT map is created. A PIT map is a completed mapping between the primary volume and secondary volume at the time of the snapshot. When a particular snapshot is selected, the delta map referencing that particular point in time is selected and all of the delta maps before that time are merged together to create the entire PIT map. If the PIT map falls within an APIT window, the closest delta map before this point in time is used and is merged with all the previous delta maps along with the entries between the delta map and the point at which the snapshot was taken, if needed.

The creation of a PIT map can be performed dynamically, providing access to the snapshot immediately. In the case when an access to data is in a region of the PIT map that has not yet been fully resolved (merged), the delta map merging is performed immediately for that region. PIT maps may be stored persistently or retained as temporary objects and the volumes that are presented on the basis of these PIT maps are preferably read/writeable. When PIT maps are stored as temporary objects, new writes are stored in a temporary area such that the previous point in time can be recreated again without the new writes. However, as explained above, these temporary writes may be retained for the long term. When PIT maps are stored persistently, information about a PIT map including the disk location, where the map is stored, and the point in time of the PIT map are also made persistent. In this case, in the event of a restart, any task that was active for a PIT map will be restarted by the map manager.

It is noted that snapshots may be taken and thus corresponding PIT maps created simply to improve system performance. When merging maps, it is never necessary to return further back than the most recent PIT map because by definition the PIT map includes mapping information for every block on disk at whatever time the PIT map was created. For example, where a PIT map was created subsequent to a certain time, any restore would only require delta maps back to the PIT map. While performance optimizing PIT maps may be retained, regular PIT maps (PIT maps created to perform an actual restore) do not need to be retained long term, particularly if the space requirements are too great.

File Browsing

Users should be able to browse files and folders and search for files with certain contents, even in the absence of a server. It is inefficient to recover an entire 200 GB volume just to check if a specific file was already corrupted at a given point in time. The present invention is able to present volumes immediately, as discussed above. So the particular file can be examined and the remainder of the volume does not need to be resolved. But this still requires a server/file system, and repeatedly mounting and unmounting different snapshots as part of searching for the appropriate version of a file to be recovered can be tedious and time consuming.

The present invention has the capability of decoding file system information and presenting the user with browsable list of files via FTP or a Web interface. This interface allows users to browse to a specific directory or file and then navigate to the previous/next (or any other) snapshot that was taken of the selected file. Only the necessary blocks will be resolved for this operation, and users are able to navigate through terabytes of data in a minimal amount of time to find the restore volume they are looking for or to just restore the file or directory they are trying to recover.

Figure 3A:
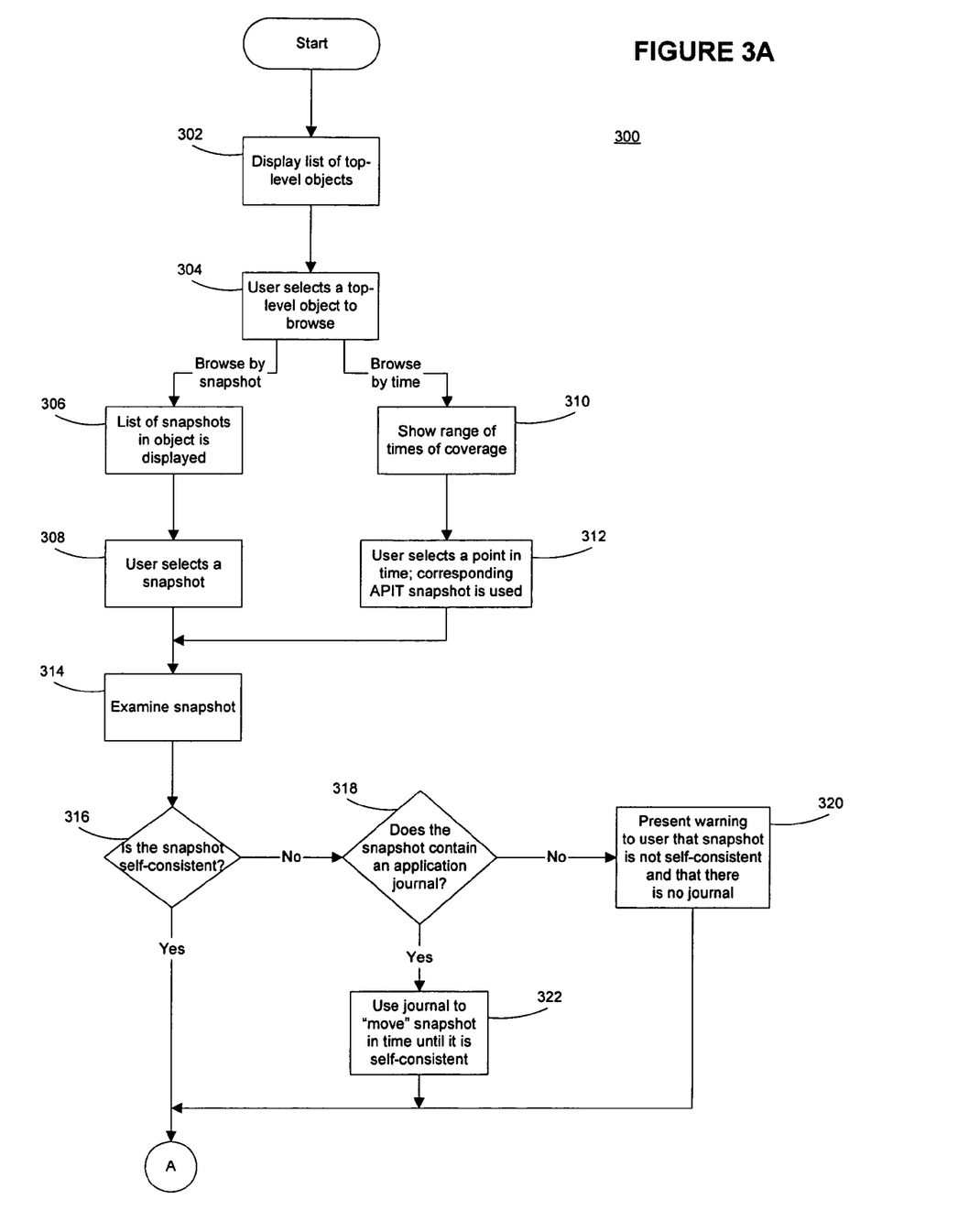
FIGS. 3A and 3B are flowcharts of a method for browsing a single snapshot or a single point in time.
Figure 3B:
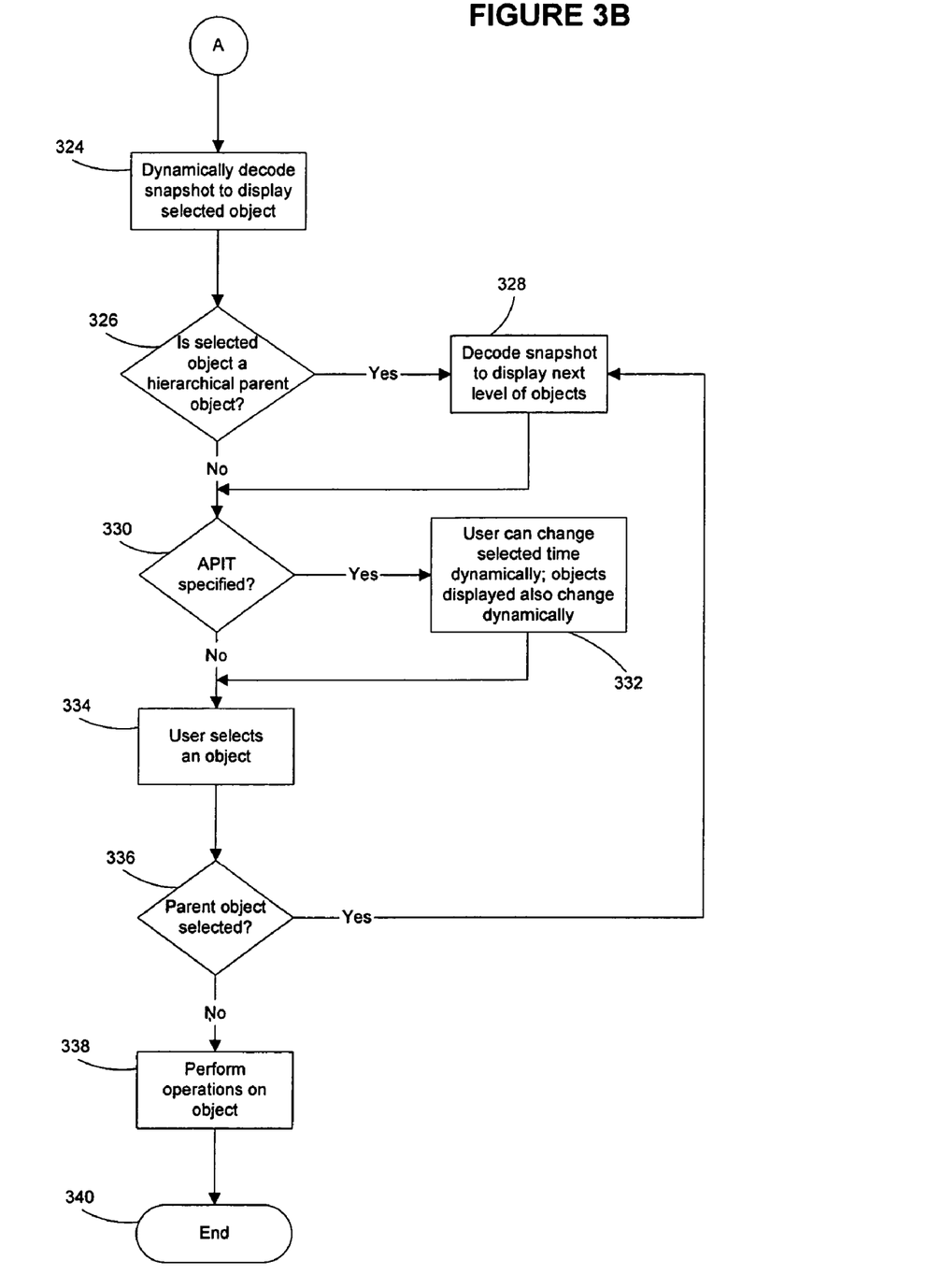

FIGS. 3A and 3B are flowcharts of a method 300 for browsing a single snapshot or a single point in time. The method 300 begins by displaying a list of top-level objects to a user, such as disk partitions, file systems, or databases (step 302). The user selects a top-level object to browse (step 304), and the user may elect to browse the object by snapshots of the object or by a time during which the object was protected. If the user browses by snapshot, a list of snapshots contained in the selected object is displayed (step 306) and the user selects a snapshot from the list (step 308).

If the uses browses by time, a range of times for which the selected object was protected is shown (step 310). For example, the range could be from time t1 on day 1 to time t2 on day 4. Numerous methods for permitting the user to select a time range are possible, and one skilled in the art can offer the user various options in this regard. The user selects a point in time, and the APIT snapshot corresponding to the selected time is used (step 312).

After the snapshot has been selected (either via step 308 or step 312), the snapshot is examined to determine if it is self-consistent (step 314). File systems and applications often "buffer" writes meant for disks in the host computer's memory for the purpose of delaying the writes and/or reordering or consolidating the writes for performance optimization. When the buffered data is written to disk, it may not be written in the same order as it was originally placed in the buffer (i.e., it is not self-consistent). Once the host computer begins writing the buffered data to disk, the file system and/or application data may not be self-consistent until the buffer is flushed and all of the data has been written to disk. At any moment in time, only a small fraction of a file system or application data set is likely to be affected.

If the snapshot is not self-consistent (step 316), then a determination is made whether the snapshot contains an application journal (step 318). An application journal is a log of the writes made by the file system or application, and is sometimes referred to as a transaction log. If the snapshot does not contain an application journal, then there is a small possibility that the file system would be affected. The user is presented with a warning that the snapshot is not self-consistent and that there is no journal (step 320).

If the snapshot contains an application journal (step 318), then the journal is used to "move" the snapshot in time until it is self-consistent (step 322). Because the system provides continuous data protection, it is possible to recover from any point in time, and therefore it is possible to "move" the snapshot to a PIT in which the snapshot is self-consistent. This movement may be forward or backwards in time.

Regardless of whether the snapshot is self-consistent or contains a journal (steps 316, 320, or 322), the snapshot is dynamically decoded to display the selected object (step 324). This decoding step involves comparing the metadata in the snapshot with known metadata values, to decode the underlying file structure. As long as the metadata is known, any type of information can be decoded, including, but not limited to, file systems, database structures, and electronic mail systems.

The first time step 324 is performed, the selected object is the snapshot (either the user-selected snapshot or the APIT snapshot). The selected object is examined, and a determination is made whether it is a hierarchical parent object (step 326). A hierarchical parent object is, for example, a directory (children are other directories and/or files) or a database table (children are records). If the selected object is a hierarchical parent object, then the snapshot is decoded to display the next level of objects (i.e., children objects; step 328).

Regardless of whether the selected object is a hierarchical parent object (steps 326 and 328), a determination is made whether an APIT has been specified (step 330). This will occur if the user has selected to browse for an object by time. If an APIT has been specified, then the user can change the selected time dynamically, which also causes the objects displayed to change dynamically (step 332). In one embodiment of the invention, a slider-type user interface element is used to change the selected time. By moving the slider, the user changes the selected time and the displayed objects dynamically. One skilled in the art will appreciate that other means for changing the selected time can be implemented.

The user next selects an object contained in the decoded snapshot (step 334). A determination is made whether the selected object is a parent object (step 336). If the selected object is a parent object, then the snapshot is further dynamically decoded to display the next level of objects (step 328) and the method 300 continues as described above. If the selected object is not a parent object (step 336), then the user can perform operations on the object (step 338) and the method terminates (step 340). The operations that can be performed on an object include: reading the contents of the object; performing a simple recovery of the object, in which the contents of the object (and potentially all of its children objects) are copied to an alternate location; and performing a more complex recovery, in which the object interacts with other applications. An example of a more complex recovery would be interacting with Microsoft Exchange to rebuild a mail box or to recover a deleted message. It is noted that the previously listed operations are merely exemplary; any operation can be performed on the object that has been recovered as could be performed on the object when it was first created.

Figure 4A:
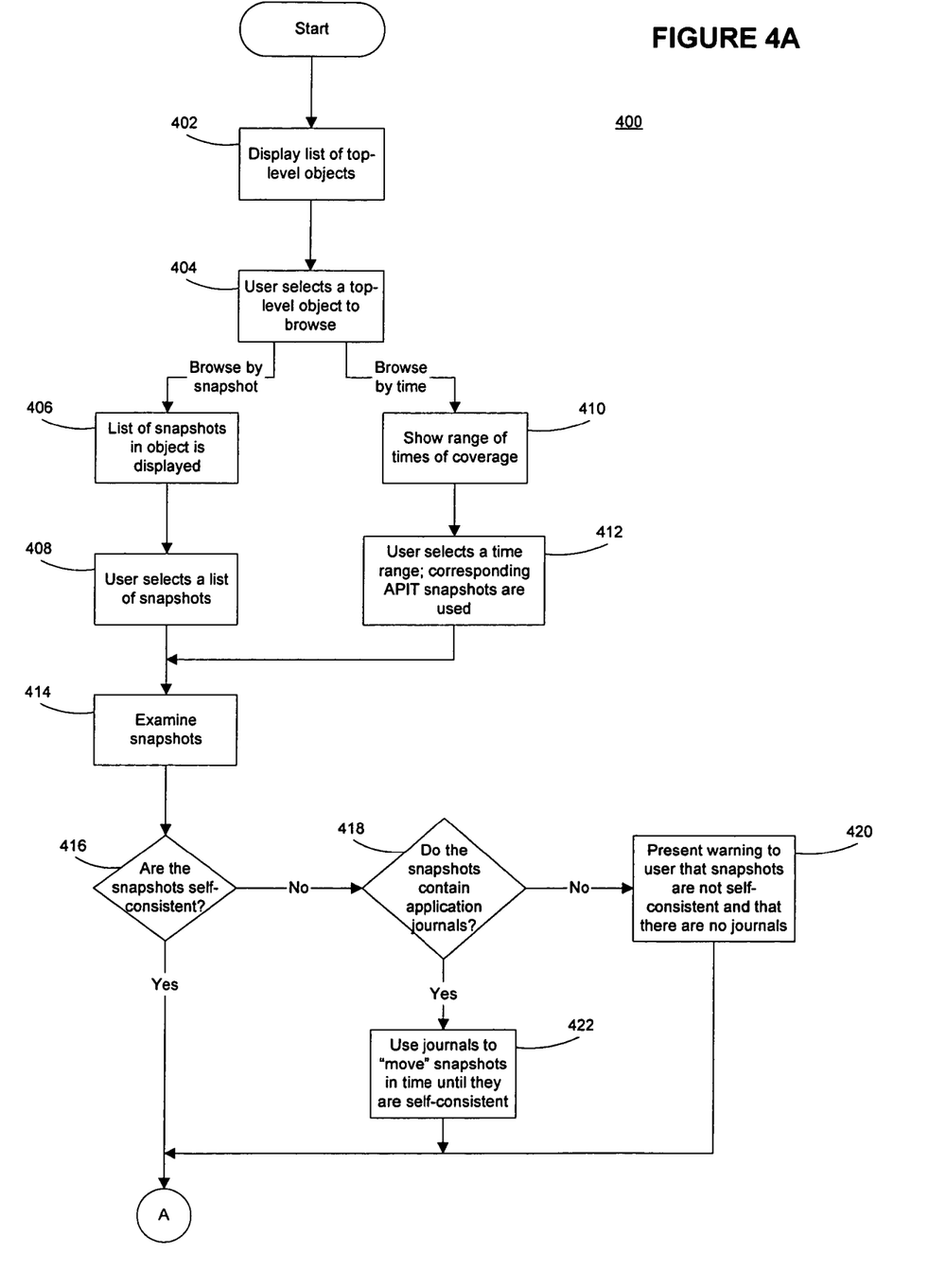
FIGS. 4A and 4B are flowchart of a method for browsing multiple snapshots or a time window.
Figure 4B:
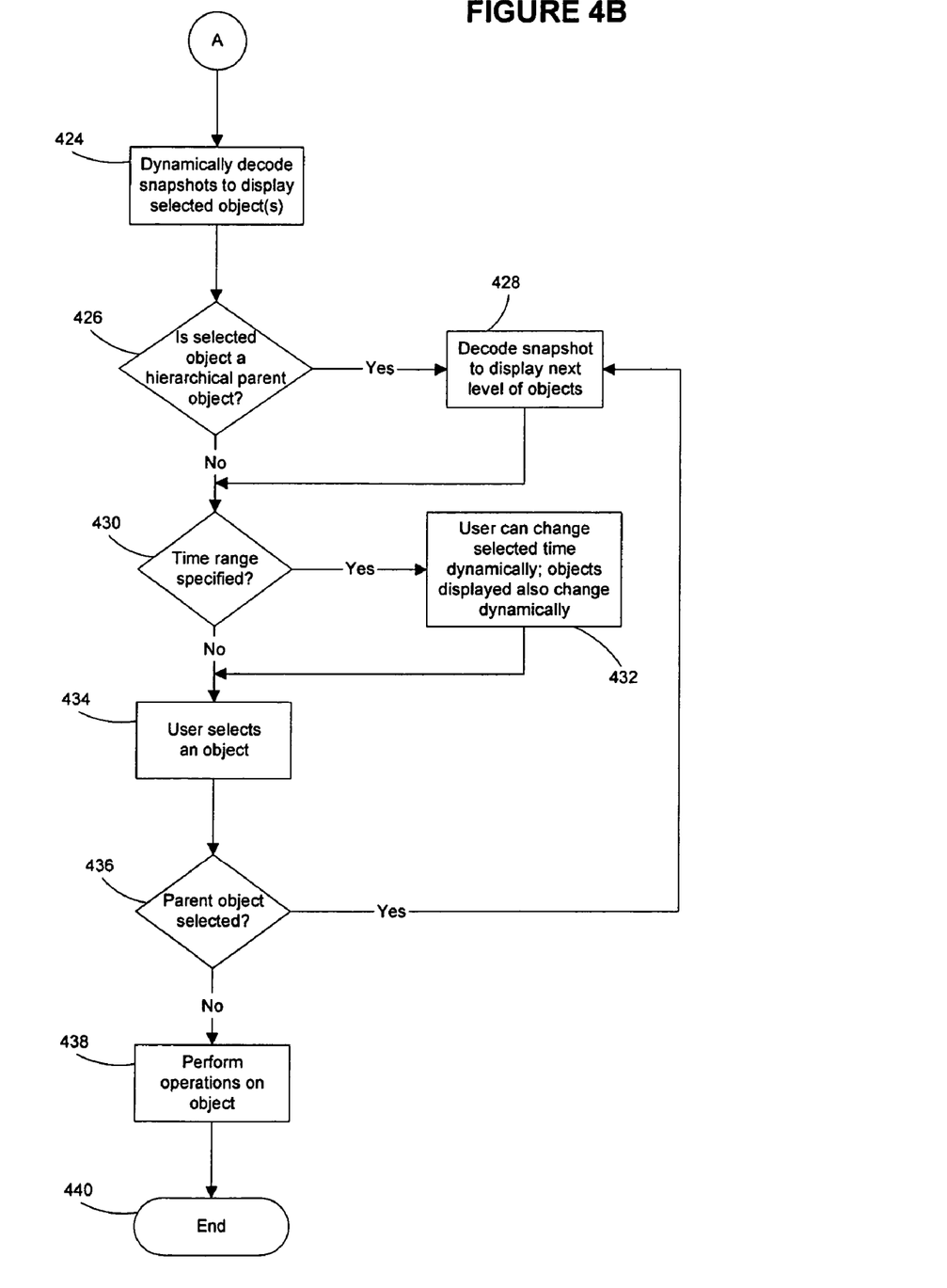

FIGS. 4A and 4B are flowcharts of a method 400 for browsing multiple snapshots or a time window. The method 400 begins by displaying a list of top-level objects to the user, such as disk partitions, file systems, or databases (step 402). The user selects a top-level object to browse (step 404), and the user may elect to browse the object by snapshots of the object or by a time during which the object was protected.

If the user browses by snapshot, a list of snapshots contained in the selected object is displayed (step 406) and the user selects a list of snapshots to browse (step 408). When browsing a range of snapshots, there are two ways in which the system can display multiple instances of the same file. One way is for the system to display the version of the object that is in each of the snapshots, even if there are no changes to the object between snapshots. Another way is for the system to display each instance of the object in which the object has changed. For example, if an object is identical in all snapshots, then only a single instance of the object is displayed. If an object was modified between two of the snapshots, then two instances of the object would be displayed. This can be extrapolated such that if an object was modified N times between the designated start point and end point, then the object would be displayed N times.

If the user browses by time, a plurality of time range for which the selected object was protected is shown (step 410). The user selects a time range from the plurality of ranges over which to browse, and the APIT snapshots corresponding to the selected time range are used (step 412). When browsing a particular time range, the blocks associated with an object are determined and the system notes the times during that range that the contents of the object changed. Using this method, a "change history" of the object is displayed. The user can then select a point in the change history of the object.

After the snapshots have been selected (either via step 408 or step 412), the snapshots are examined to determine if they are self-consistent (step 414). If the snapshots are not self-consistent (step 416), then a determination is made whether the snapshots contain application journals (step 418). If the snapshots do not contain application journals, then there is a small possibility that the file system would be affected. The user is presented with a warning that the snapshots are not self-consistent and that there are no journals (step 420).

If the snapshots contain application journals (step 418), then the journals are used to "move" the snapshots forward or backwards in time until they are self-consistent (step 422).

Regardless of whether the snapshot is self-consistent or contains a journal (steps 416, 420, or 422), the snapshots are dynamically decoded to display the selected object(s) (step 424). The first time step 424 is performed, the selected object(s) are the snapshots. For clarity purposes, the remainder of the discussion refers to a single object; however, the principles of the present invention are equally applicable to handling multiple objects simultaneously. The selected object is examined, and a determination is made whether the object is a hierarchical parent object (step 426). If a selected object is a hierarchical parent object then the snapshot is decoded to display the next level of objects (i.e., children objects; step 428).

Regardless of whether the selected object is a hierarchical parent object (steps 426 and 428), a determination is made whether a time range has been specified (step 430). This will occur if the user has selected to browse for an object by time. If a time range has been specified, then the user can change the selected time range dynamically, which also causes the objects displayed to change dynamically (step 432). In one embodiment of the invention, slider-type user interface elements are used to change the start point and the end point of the selected time range. By moving the sliders, the user changes the selected time range and the displayed objects dynamically. One skilled in the art will appreciate that other means for changing the selected time can be implemented.

The user next selects an object contained in the decoded snapshot (step 434). A determination is made whether the selected object is a parent object (step 436). If the selected object is a parent object, then the snapshot is further dynamically decoded to display the selected object (step 424) and the method 400 continues as described above. If the selected object is not a parent object (step 436), then the user can perform operations on the object (step 438) and the method terminates (step 440).

The method 400 provides a three-dimensional front end for browsing a file system. The range selected by the user (either by discrete snapshots or by a time window) defines the bounds of the objects that can be browsed. If a particular object exists in multiple snapshots, that object will appear in the list presented to the user (steps 424, 428, 432) multiple times, once for each snapshot in which it appears. By this mechanism, a user can easily browse a single object at different points in time, without having to load the complete snapshot where the object is stored.

Automated searches can be performed in a similar fashion, such that the system could automatically find a certain file or content. For example, if a virus struck and corrupted the system, it is difficult to navigate many volumes by time. This is because the virus could have been there already for a long time. Executable files don't change over time, except when a virus strikes, so the system could be queried to find the point in time when the executable changed. Another useful query would be to see a list of different versions of the same file, including size and attributes. From the list, the user can immediately determine the time when the file was updated, for example, during an all-night work session, because it will include the greatest number of changes.

While specific embodiments of the present invention have been shown and described, many modifications and variations could be made by one skilled in the art without departing from the scope of the invention. The above description serves to illustrate and not limit the particular invention in any way.

What is claimed is:

1. A method for browsing objects on a protected volume in a continuous data protection system, comprising the steps of:
    (a) displaying a list of top-level objects on the protected volume to a user;
    (b) presenting to the user a top-level object on the protected volume to browse;
    (c) providing the user a first browsing option and a second browsing option for browsing the top-level object, wherein:
        (i) the first browsing option provides a list of snapshots of the top-level object, enabling the user to select a desired snapshot from the list of snapshots;
        (ii) the second browsing option provides a list of range of times, each range of time indicating a start-time and an end-time between which the selected top-level object was protected, wherein, upon the user selecting a particular range of time from the list of range of times, the second browsing option provides, a list of snapshots of the top-level object corresponding to the particular range of time, enabling the user to select a desired snapshot from the list of snapshots corresponding to the particular range of time; and
    (d) decoding the desired snapshot and displaying a list of objects corresponding to the desired snapshot;
    (e) verifying that the selected snapshot is self-consistent, wherein if the selected snapshot is not self-consistent, then determining if the selected snapshot contains an application journal, and wherein if the selected snapshot contains an application journal, then using the application journal to adjust the selected snapshot in time until it is self-consistent; wherein if the selected snapshot does not contain an application journal, then presenting a warning to the user that the snapshot is not self-consistent;
    (f) enabling the user to select a particular object from the list of objects;
    (g) decoding the particular object; and
    (h) performing operations on the particular object.

2. The method according to claim 1, further comprising: enabling the user to dynamically change the desired snapshot, wherein the desired snapshot is dynamically decoded to display a corresponding list of objects.

3. The method according to claim 1, wherein the step of decoding the particular object further comprises:
    determining if the selected object is a parent object; and
    displaying a next level of objects if the selected object is a parent object.

4. The method according to claim 1, wherein the step of performing operations on the particular object includes reading the contents of the selected object.

5. The method according to claim 1, wherein the step of performing operations on the particular object includes recovering the selected object.

6. The method according to claim 1, wherein the step of performing operations on the particular object includes using the selected object to interact with another application.

7. A system for browsing objects on a protected volume in a continuous data protection system, the system comprising:
    a processor to execute a set of instructions to enable browsing of objects in the continuous data protection system, the set of instructions including:
        a display means for displaying a list of objects on the protected volume to a user to browse, wherein the display means presents a top-level object for the user to browse, the top-level object having a first browsing means and a second browsing means, such that:
            the first browsing means enables the user to select a desired snapshot from a list of snapshots corresponding to the top-level object; and
            the second browsing means enables the user to select a desired time range from a list of time ranges, each time range indicating a start-time and an end-time between which the top-level object was protected, wherein, upon the user selecting a particular time range from the list of time ranges, the second browsing means provides a list of snapshots of the top-level object, enabling the user to select a desired snapshot from the list of snapshots corresponding to the particular time range;
        a selecting means for selecting the desired snapshot;
        a decoding means for decoding the desired snapshot and displaying a list of objects corresponding to the desired snapshot;

a verifying means for verifying that the desired snapshot is self-consistent, wherein if the desired snapshot is not self-consistent, then determining if the desired snapshot contains an application journal, and wherein if the desired snapshot contains an application journal, then using the application journal to adjust the desired snapshot in time until it is self-consistent; wherein if the selected snapshot does not contain an application journal, then presenting a warning to the user that the snapshot is not self-consistent and that the snapshot does not contain an application journal;

an enabling means for enabling the user to select a particular object from the list of objects;

a decoding means for decoding the particular object;

an operations means for performing operations on the particular object; and a storage memory to store the set of instructions for execution by the processor.

8. The system according to claim 7, wherein said selecting means is used by the user to select a top-level object;

said decoding means decodes the selected top-level object;

said decoding means decodes a snapshot corresponding to the selected point in time;

said display means displays a list of objects in the decoded snapshot;

said selecting means is used by the user to select an object in the decoded snapshot;

said decoding means decodes the selected object; and said performing means performs an action on the selected object.

9. The system according to claim 7, wherein said selecting means is used by the user to dynamically change the selected point in time;

said decoding means decodes a second snapshot corresponding to the newly selected point in time; and said display means displays a list of objects in the decoded second snapshot, whereby the displayed list of objects dynamically changes according to the newly selected time.

10. The system according to claim 7, wherein said performing means reads the contents of the selected object.

11. The system according to claim 7, wherein said performing means recovers the selected object.

12. The system according to claim 7, wherein said performing means uses the selected object to interact with another application.

\* \* \* \* \*